United States Patent
Clemm et al.

(10) Patent No.: US 8,156,319 B2
(45) Date of Patent: Apr. 10, 2012

(54) SELF-RESTARTING NETWORK DEVICES

(75) Inventors: Alexander Clemm, Los Gatos, CA (US); Junekang Yang, Palo Alto, CA (US); Steve Chen-Lin Chang, Cupertino, CA (US); Jiabin Zhao, Saratoga, CA (US); Shyyunn Sheran Lin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 743 days.

(21) Appl. No.: 12/191,203

(22) Filed: Aug. 13, 2008

(65) Prior Publication Data
US 2010/0042820 A1    Feb. 18, 2010

(51) Int. Cl.
*G06F 15/177*  (2006.01)
(52) U.S. Cl. ............... 713/2; 713/1; 714/2; 370/216
(58) Field of Classification Search ............ 713/1, 2; 714/2; 370/216
See application file for complete search history.

(56) References Cited

U.S. PATENT DOCUMENTS

| | | | |
|---|---|---|---|
| 7,146,345 B2* | 12/2006 | Weik et al. | 705/418 |
| 7,296,073 B1* | 11/2007 | Rowe | 709/227 |
| 7,349,327 B2* | 3/2008 | Puon et al. | 370/216 |
| 7,743,155 B2* | 6/2010 | Pisharody et al. | 709/227 |
| 2002/0123309 A1* | 9/2002 | Collier et al. | 455/67.1 |
| 2008/0059836 A1* | 3/2008 | Fujii | 714/15 |

* cited by examiner

*Primary Examiner* — Thuan Du
(74) *Attorney, Agent, or Firm* — Hickman Palermo Truong & Becker LLP

(57) ABSTRACT

A method and apparatus for self-monitoring to identify an occurrence of a threshold and rebooting in response to the occurrence of the threshold is provided. In an embodiment, a data processing apparatus comprises one or more processors; logic coupled to the one or more processors and comprising one or more stored sequences of instructions which, when executed by one or more processors, cause the one or more processors to obtain a threshold associated with the apparatus; self-monitor the apparatus to identify an occurrence of the threshold; and self-reboot the apparatus responsive to the occurrence of the threshold.

22 Claims, 9 Drawing Sheets

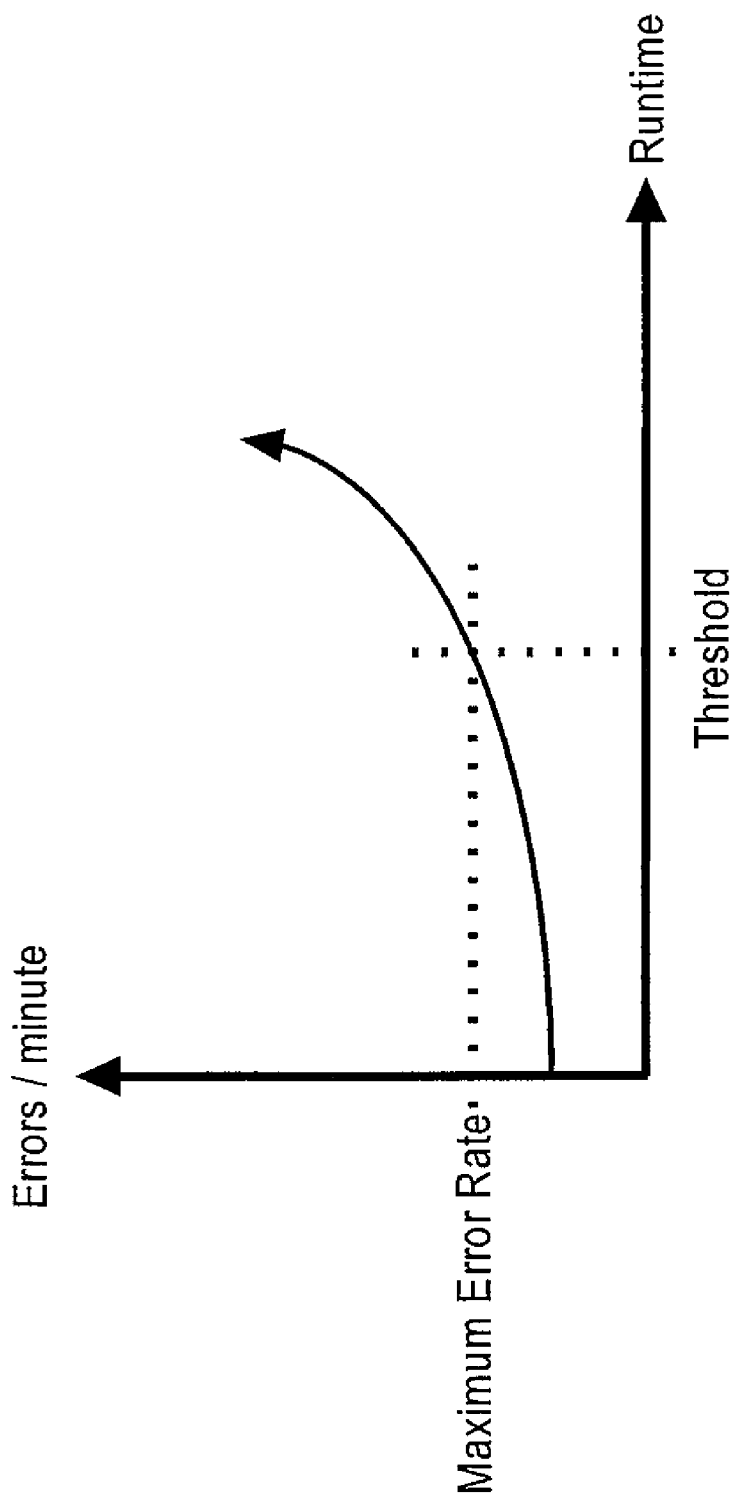

US 8,156,319 B2

SELF-RESTARTING NETWORK DEVICES

TECHNICAL FIELD

The present disclosure generally relates to data communication networks. The disclosure relates more specifically to network device failures.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of devices including links (communication paths such as telephone or optical lines) and nodes (for example, routers and switches directing the packet along one or more of a plurality of links connected to it) according to one of various routing protocols.

In some instances, network devices may be misconfigured, fail, experience a hardware fault or software error, or otherwise behave incorrectly resulting in service outages and routing protocol failure. Many failures are a consequence of "aging", i.e., a system having been up and running without a reboot. Aging causes failures because network devices become unstable over time due to system inconsistencies. The system inconsistencies may be caused by buffer overflows, memory leaks, timing-related concurrency bugs, and system process termination. For example, routers often experience memory hogging that causes processes to be shut down, which in turn lead to system instabilities, degraded router performance, or failure.

Unplanned network device failures require fault management and diagnostic activities to determine and remove the root cause of the failure and repair the network. However, the fault management and diagnostic activities are labor and capital intensive and accordingly, contribute significantly to the cost of operating a network and supporting operational infrastructure.

BRIEF DESCRIPTION OF THE DRAWINGS

In the drawings:

FIG. 3A and FIG. 3B illustrate self-rebooting a node in accordance with an embodiment;

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 General Overview

In an embodiment, an apparatus comprises one or more processors; logic operable in a network and coupled to the one or more processors and comprising one or more installed sequences of instructions which, when executed by one or more processors, cause the one or more processors to obtain a threshold associated with the apparatus; self-monitor the apparatus to identify an occurrence of the threshold; and self-reboot the apparatus responsive to the occurrence of the threshold.

In an embodiment, the threshold is any one of a utilization threshold of a component in the apparatus; an error rate threshold associated with the apparatus; a packet drop rate threshold associated with the apparatus; and an elapsed runtime threshold of the apparatus.

In an embodiment, the apparatus is a router or a switch.

In an embodiment, the logic further comprises instructions which when executed cause the one or more processors to decrease network traffic routed through the apparatus prior to rebooting the apparatus.

In an embodiment, the logic further comprises instructions which when executed cause the one or more processors to drop network traffic routed through the apparatus prior to rebooting the apparatus by any one of increasing a cost of one or more links associated with the apparatus prior to rebooting the apparatus; temporarily disconnecting or disabling a connection from the apparatus to one or more network devices prior to rebooting the apparatus; or notifying one or more network devices of a rebooting time prior to rebooting the apparatus.

In an embodiment, the logic further comprises instructions which when executed cause the one or more processors to coordinate a rebooting time of the apparatus with a rebooting time of one or more network devices.

In other aspects, the disclosure encompasses a computer-implemented method and a computer-readable medium to implement the functions described herein.

2.0 Structural and Functional Overview 2.1 Logic and Processing Functions

Figure 1:
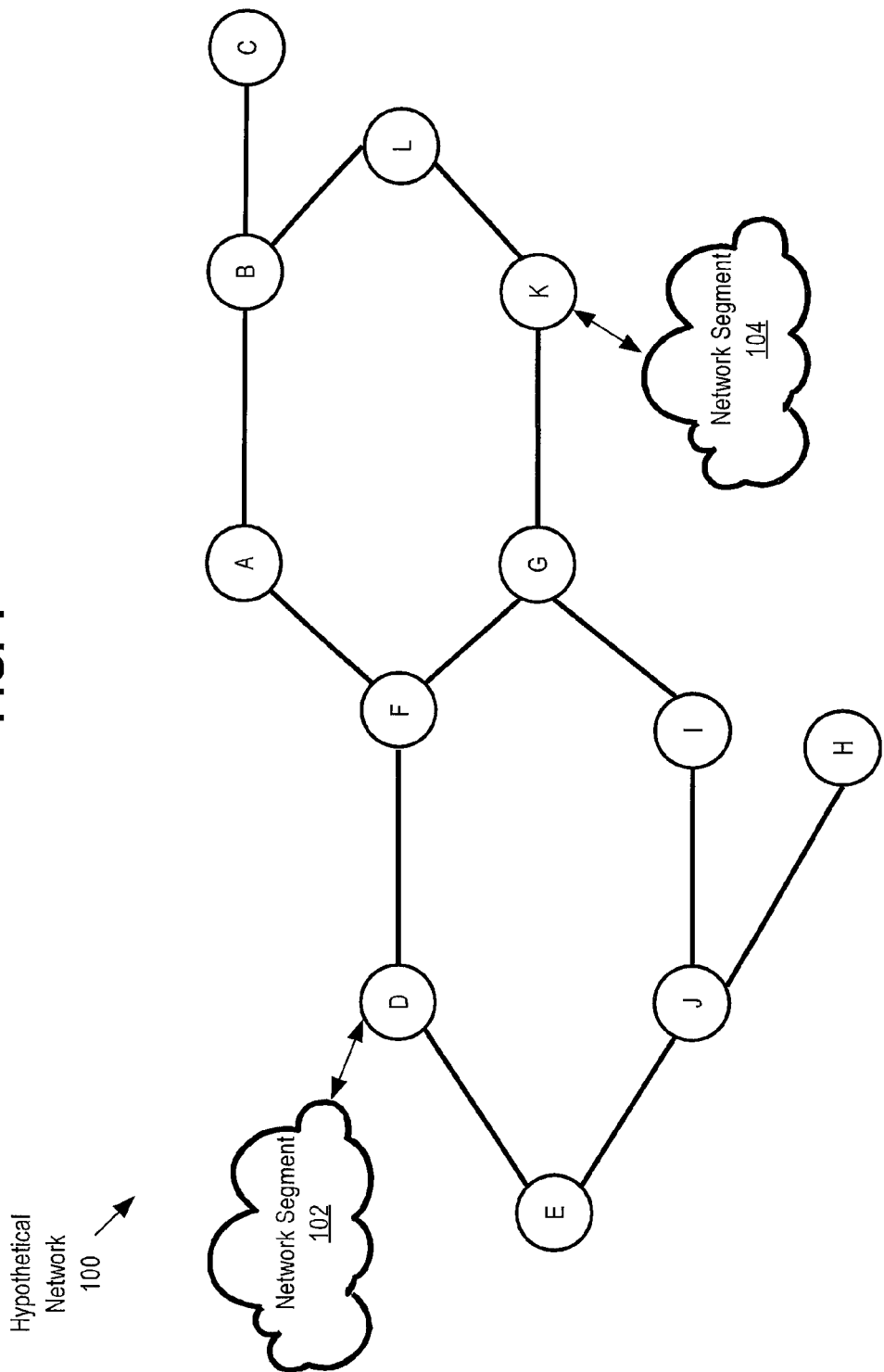
FIG. 1 illustrates a network in accordance with an embodiment.

FIG. 1 illustrates a network in accordance with an embodiment. In FIG. 1, a hypothetical network 100 may be implemented by any medium or mechanism that provides for the transportation of data between devices within the network. Examples of the hypothetical network 100 include, without limitation, a network such as a Local Area Network (LAN), Wide Area Network (WAN), the Internet, Intranet, Extranet with terrestrial, satellite or wireless links, etc. Alternatively or additionally, any number of nodes connected within the network may also be directly connected to each other through wired or wireless communication segments.

The hypothetical network 100 comprises a network segment 102, a network segment 104, and nodes A through L between the network segment 102 and the network segment 104. For purposes of illustrating a clear example, a limited number of network segments and nodes are shown in FIG. 1, but the techniques herein may be applied in any network of any size. Each node comprises a computing element or apparatus such as a router or switch. Each of the nodes comprises a processor, a switching system, memory, and other suitable hardware elements. Each of the nodes further comprises installed program control logic in the form of firmware, hardware, software, or a combination thereof that can implement the functions described herein. In an embodiment, each node comprises an operating system, such as Cisco IOS Software from Cisco Systems, Inc., San Jose, Calif. The operating system may host or control applications such as a self-rebooting logic, which comprises firmware, hardware, software, or a combination thereof that can implement the functions described below. In this context, "rebooting" refers to any of restarting, powering down and powering on, initiating a bootstrap loader, invoking a reboot function, and the like.

Further, although the nodes are illustrated within a network, in an embodiment, a node may correspond to a standalone system that is not connected to any network. Alternatively, the node may correspond to a system in a client-server network or a peer to peer network. In addition, a node may be accessible from other machines using one or more interfaces. Example interfaces include a user interface, a web portal, or any other tool to access the node.

Figure 2:
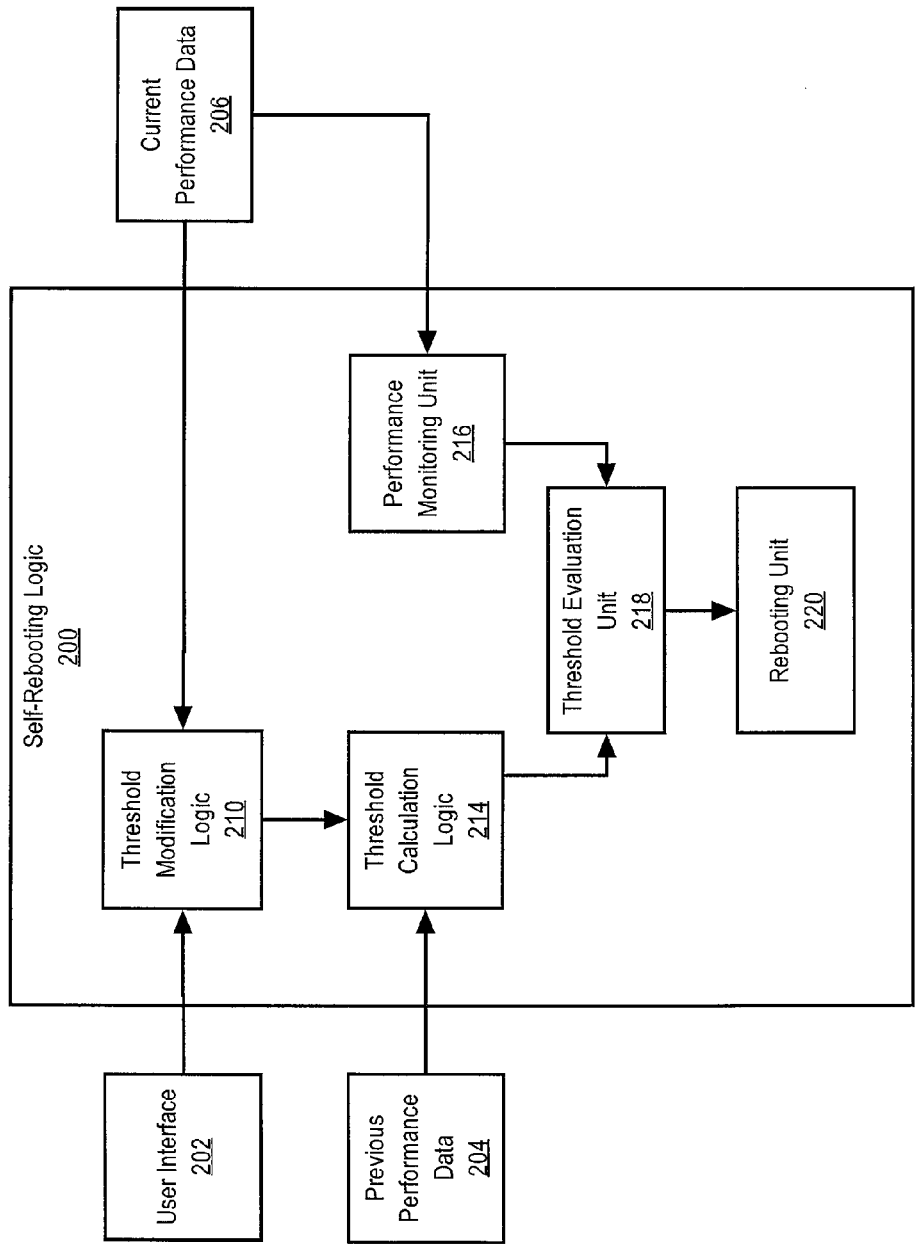
FIG. 2 illustrates an example of self-rebooting logic in accordance with an embodiment.

FIG. 2 illustrates an example of self-rebooting logic in accordance with an embodiment. In an embodiment, each node in the network includes self-rebooting logic 200 which is configured to self-reboot the respective node when a predetermined threshold is met. In an embodiment, the self-rebooting logic 200 comprises threshold modification logic 210, threshold calculation logic 214, a performance monitoring unit 216, a threshold evaluation unit 218, and a rebooting unit 220.

In an embodiment, the threshold calculation logic 214 is configured to obtain previous performance data 204, and to calculate, based on the previous performance data, a threshold value for rebooting a respective node. The previous performance data 204 may include data related to memory fragmentation, memory misallocation, CPU utilization, error severity, CPU hog messages, buffer overflow data, error pattern data, packet drop count, stack overflows, and any other performance related data associated with the node.

In an embodiment, the threshold value calculated by the threshold calculation logic 214 may be time based, symptom based, error based, or based on any other suitable criteria. A time based threshold value may specify a period for runtime the apparatus can operate following a reboot before it has to be rebooted again. A symptom based threshold value may specify a tolerance level for a particular type of error. For example, a symptom based threshold value may specify a number of dropped packets that are to be tolerated prior to rebooting the apparatus. Another example may involve a symptom based threshold value that specifies a memory utilization level of an apparatus which when reached triggers a reboot. Accordingly, the threshold value determined by the threshold calculation logic 214 may reflect a tolerance level or limit for any type of error, error message, symptoms related to errors, runtime, or other attributes that can be monitored. In an embodiment, multiple thresholds may be used in combination such that different tolerance levels corresponding to different error types are used, where an occurrence of one or other specified number of thresholds triggers a reboot.

In an embodiment, the threshold value determined by the threshold calculation logic 214 may be based on input received from the threshold modification logic 210. The threshold modification logic 214 is configured to provide a new threshold value, increase a previously calculated threshold value, decrease a previously calculated threshold value or remove a threshold value based on input from the user interface 202. The user interface 202 may be used by a user or mechanical equivalent, such as a machine, program, or process to set the threshold, increase the threshold, decrease the threshold or even delete the threshold.

Further, the threshold modification logic 210 may be configured to recalculate the threshold value based on current performance data 206. In an embodiment, the current performance data 206 may include real time data related to errors, error messages, or symptoms related to errors. Further, the current performance data 206 may also include general information about a node such as the elapsed time since the last reboot.

In an embodiment, the performance monitoring unit 216 which may be located on the node itself is configured to monitor the node or communicate with a network management station to obtain the current performance data 206. The performance monitoring unit 216 may be configured to collect a portion or all of the current performance data 206. For example, the performance monitoring unit 216 may be configured to obtain only the current performance data 206 requested by the threshold evaluation unit 218, such as data related to the threshold. In another embodiment, the performance monitoring unit 216 may collect current performance data 206 to build a database of performance data to be used for later threshold calculations or perform other management actions.

In an embodiment, the threshold evaluation unit 218 comprises one or more elements or hardware, software or a combination configured to compare a threshold received from the threshold calculation logic 214 and the current performance data received from the performance monitoring unit 216 to determine if the threshold is met. If the threshold is met by the current performance of the node, the rebooting unit 220 is signaled by the threshold evaluation unit 218 to reboot the node.

In an embodiment, the rebooting unit 220 is configured to reboot the node in response to receiving a signal from the threshold evaluation unit 218. In another embodiment, the rebooting unit 220 prepares the node for rebooting, as discussed below, prior to actually rebooting the node. In an embodiment, the rebooting unit 220 may reboot a portion or all of the node. For example, all programs including the operating system executing on the node may be rebooted or alternatively, only selected processes or programs may be rebooted.

2.2 Self-Rebooting Process

Figure 3A:
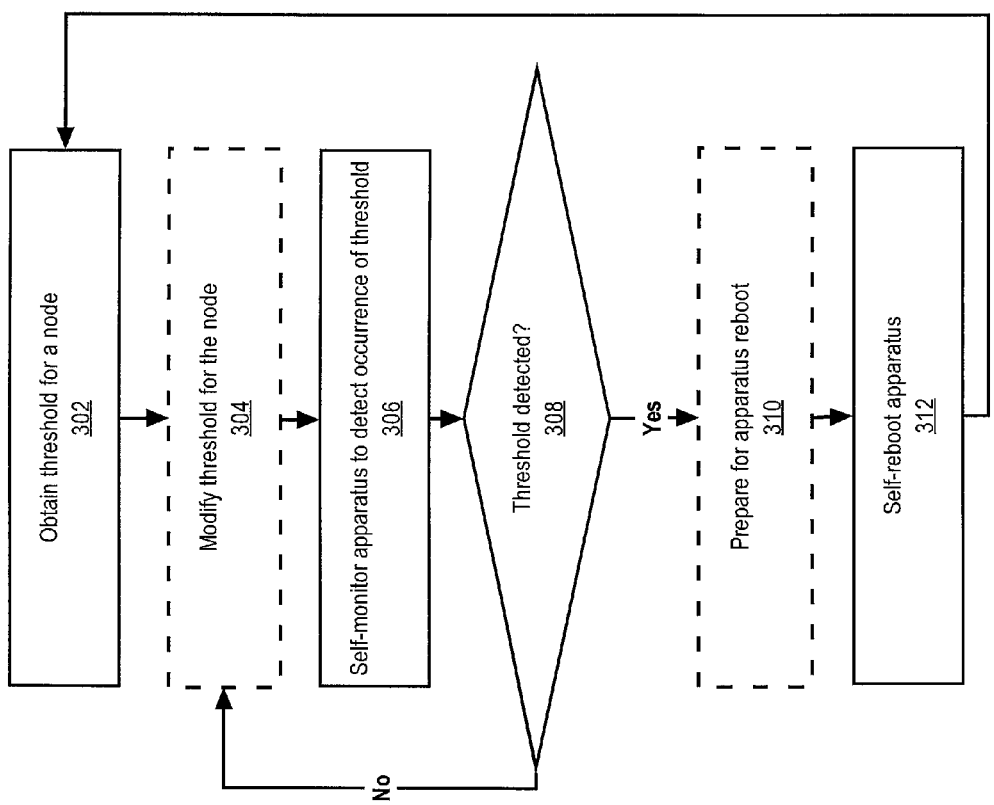

FIG. 3A illustrates self-rebooting a node in accordance with an embodiment. In one or more embodiments, one or more of the steps described below may be omitted, repeated, or performed in a different order. Accordingly, the specific arrangement of steps shown in FIG. 3A is not required.

Initially, a threshold value for a node is obtained (Step 302). The threshold value may be obtained directly from an external source, through a user interface, or calculated based on previous performance data. The threshold value is calculated from the previous performance data by analyzing the previous performance data with respect to reboot cost versus failure rate cost. For example, if a router generally performs poorly after a certain amount of time due to errors (discussed above), a threshold value may be set at a predetermined aging time of the router when the benefits of rebooting the router tend to outweigh the cost of router downtime. In this example, the average packet drop rate (or other error rate) per minute for one or more routers may be plotted against runtime since last reboot, as shown in FIG. 3B. Thereafter, the time corresponding to a predetermined maximum error rate may be used as a threshold time for rebooting the apparatus. In another embodiment, the predetermined maximum error rate may itself be used as a threshold value instead of the time. In other embodiments, a threshold value can be based on any error rate or performance rate that can be monitored.

Referring again to FIG. 3A, in an embodiment, the threshold value for the node may be modified (Step 304). The threshold value may be modified by a user. For example, using a user interface or may be modified based on current performance data. For example, if a threshold value specifies a runtime from the last reboot for rebooting a node, the threshold value may be modified based on a router that is performing better or worse than expected. In this example, if a router is performing well, but the runtime threshold value is almost met, then the runtime threshold value may be increased as there may be no reason to reboot a well performing node.

Alternatively, if a router is performing poorly, for example, a high packet drop rate is observed, and the runtime threshold value will not be met in the near future, then the runtime threshold value may be decreased as the router needs to be rebooted to improve the poor performance. In an embodiment, the threshold value may correspond to an expiration of a life lease which starts when a system is rebooted and may be extended as needed. In an embodiment, prior to expiration of a life lease, a user is informed of the termination and provided with an option to extend the life lease.

In an embodiment, the node is self-monitored to detect occurrence of the threshold value (Step 306). The node may be self-monitored by identifying failure rates or performance rates that are associated with threshold values applicable to a node. The self-monitoring may be continuous, periodic, random, or based on another suitable policy. In an embodiment, received error messages, such as memory hog messages received may be monitored and recorded. In another embodiment, self-monitoring the node may involve execution of local processes to self-monitor the node. For example, each time the node is restarted, a local process may be used to start a runtime timer which keeps track of the time since the last reboot. The data obtained by self-monitoring the node may be continuously, periodically or arbitrarily compared with the threshold value to detect occurrence of the threshold value. In an embodiment, occurrence of the threshold may be determined only during preconfigured maintenance intervals or time windows.

Based on whether the threshold value is detected (Step 308), the monitoring may be continued or the node may be rebooted (Step 312).

Additionally or alternatively, in an embodiment, the node may be prepared for rebooting (Step 310) prior to the actual reboot. In an embodiment, preparing for reboot may involve saving the current configuration data, states, logging data or other suitable information. In an embodiment, configuration balancing with adjacent nodes may be performed in accordance with pre-programmed logic. In an embodiment, preparation for rebooting involves reducing the traffic through the node. For example, the traffic through the node may be reduced by informing neighboring nodes of a planned reboot time or time window, so that the neighboring nodes do not direct traffic through the node to be rebooted. Another example may involve temporarily removing the node to be rebooted from the directories of neighboring nodes so that the neighboring nodes do not forward any data packets through the node to be rebooted. In an embodiment, a standby machine or node may be prepared for taking over prior to rebooting an active machine or node. In an embodiment, preparation for rebooting may involve sending out notifications to users, processes, machines or other suitable entities so that the entities may prepare for reboot, cancel a planned reboot, or postpone a planned reboot. In an embodiment, preparation for rebooting allows for an orderly or planned reboot instead of a disruptive reboot. Yet another example of preparation for rebooting may involve simply shutting down particular processes or programs on the node.

Figure 4A:
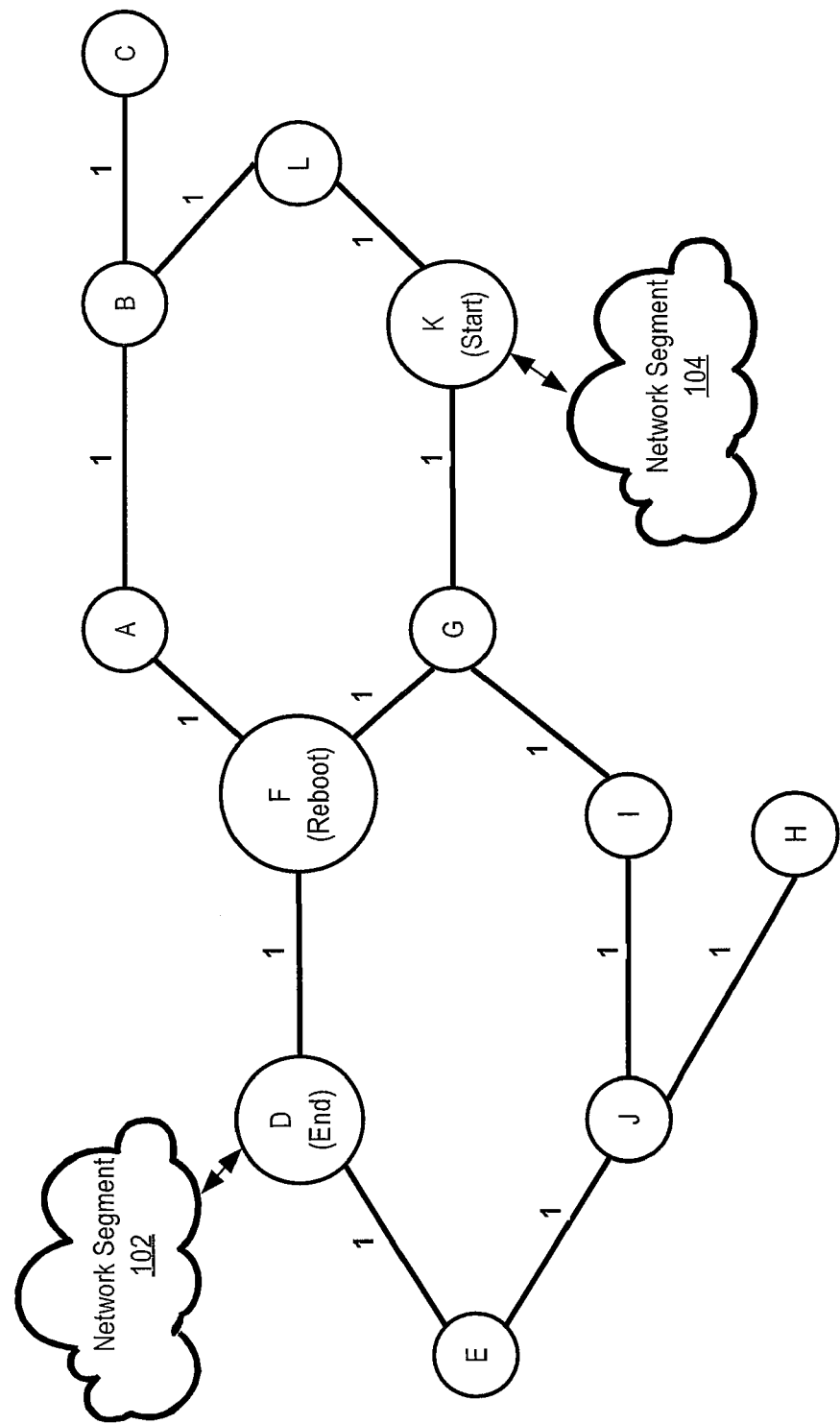
FIG. 4A, FIG. 4B, and FIG. 4C illustrate examples of preparing for self-rebooting a node in accordance with an embodiment.
Figure 4B:
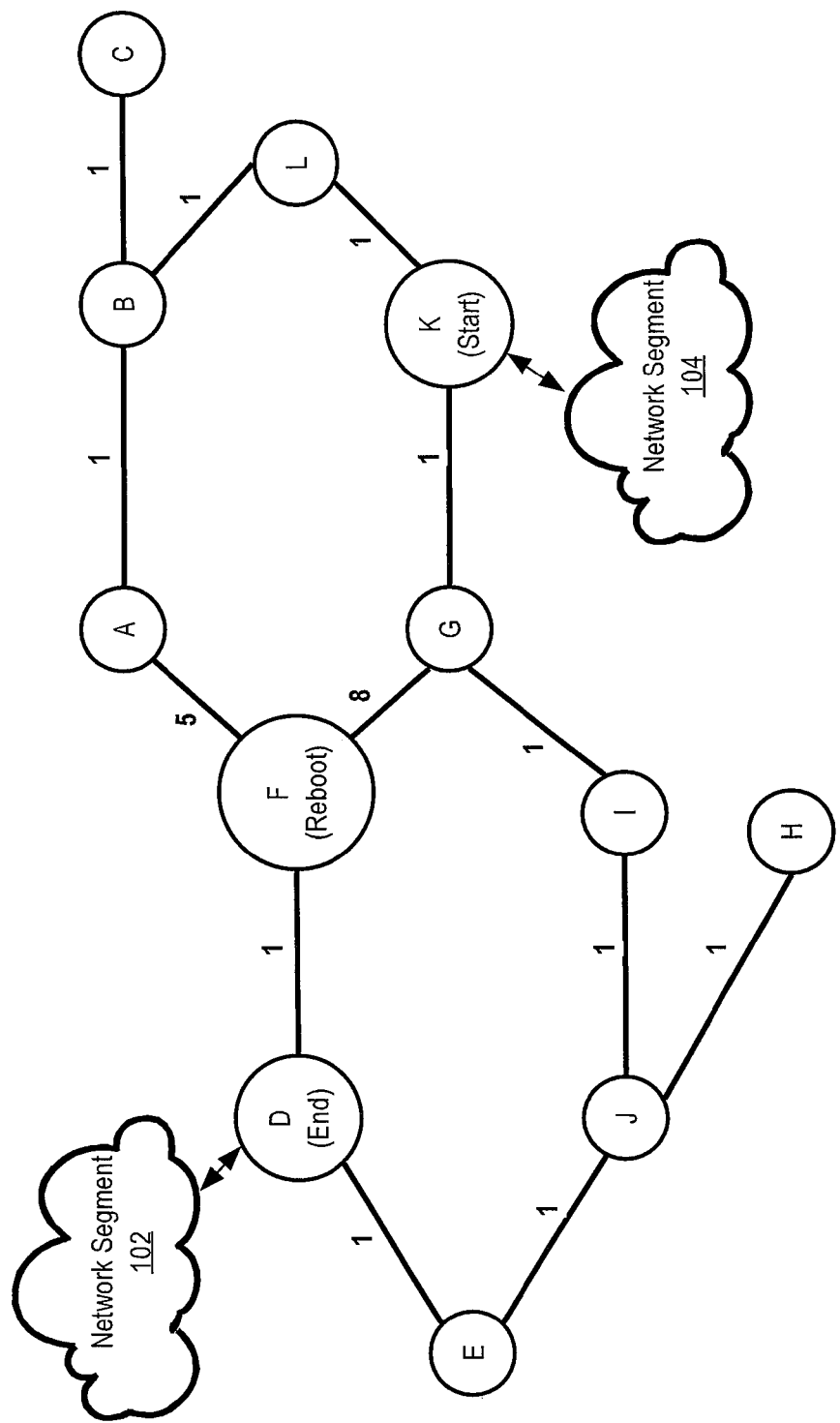
Figure 4C:
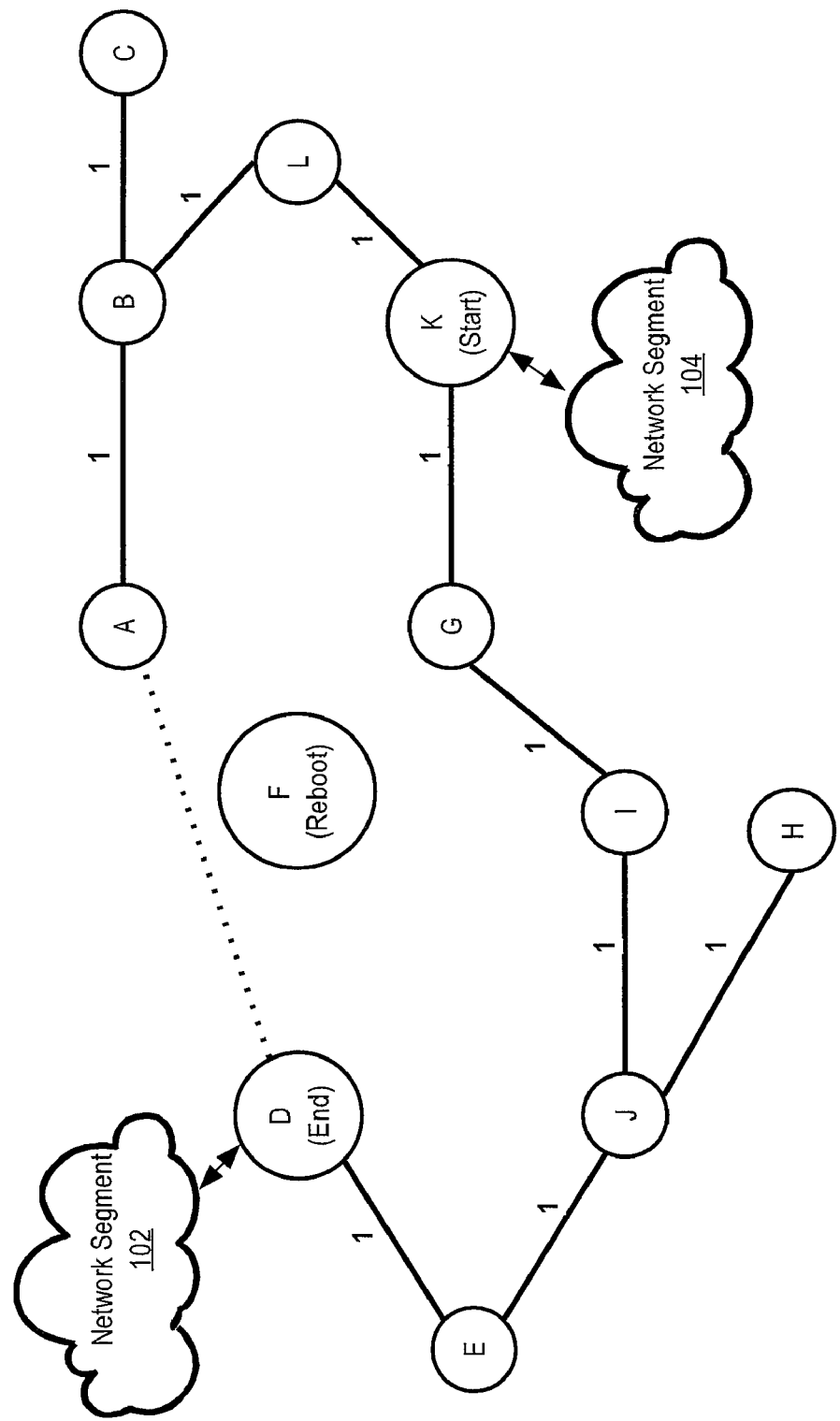

FIG. 4A, FIG. 4B, and FIG. 4C illustrate examples of preparing for self-rebooting a node in accordance with an embodiment. FIG. 4B and FIG. 4C show examples of two different possible modifications of the hypothetical network segment shown in FIG. 4A for preparation for rebooting. As shown in FIG. 4A the link costs in the hypothetical network segment are all 1 and the node F is to be rebooted. Furthermore, data packets travelling between nodes K and D may travel through the node F, as the route K-G-F-D provides the lowest link cost of "3" to traverse from node K to node D. Other routes from node K to node D such as K-G-I-J-E-D and K-L-B-A-F-D each have a link cost of "5".

In order to deter nodes from using node F, the link costs are changed as shown in FIG. 4B. Specifically, the link between nodes G and F is temporarily set to "8" and the link between nodes A and F is temporarily set to "5." Based on the new link costs, the cost of each of the three above discussed routes from node K to node D are as follows:

1) K-G-F-D=1+8+1=10
2) K-L-B-A-F-D=1+1+1+5+1=9
3) K-G-I-J-E-D=1+1+1+1+1=5

Accordingly, the third route without node F now has the lowest link cost and therefore will be used most frequently for routing data packets between nodes K and D. Accordingly, the traffic through node F will be reduced or eliminated.

FIG. 4C illustrates another example of preparation for rebooting. Instead of changing link costs as illustrated in FIG. 4B, links are disconnected or disabled as illustrated in FIG. 4C. Specifically, one or more links to node F may be disconnected or disabled in order to reduce or eliminate traffic directed to node F. Furthermore, while links to node F are disconnected or disabled, temporary new links may be established. For example, links may be established between nodes D and A. Accordingly, as shown in FIG. 4C a path for routing packets from node K to node D may be K-G-I-J-E-D. Further, if a new link is established between nodes A and D, packets may be routed from node K to node D through another path K-L-B-A-D.

2.3 Coordinated Rebooting Process

Figure 5:
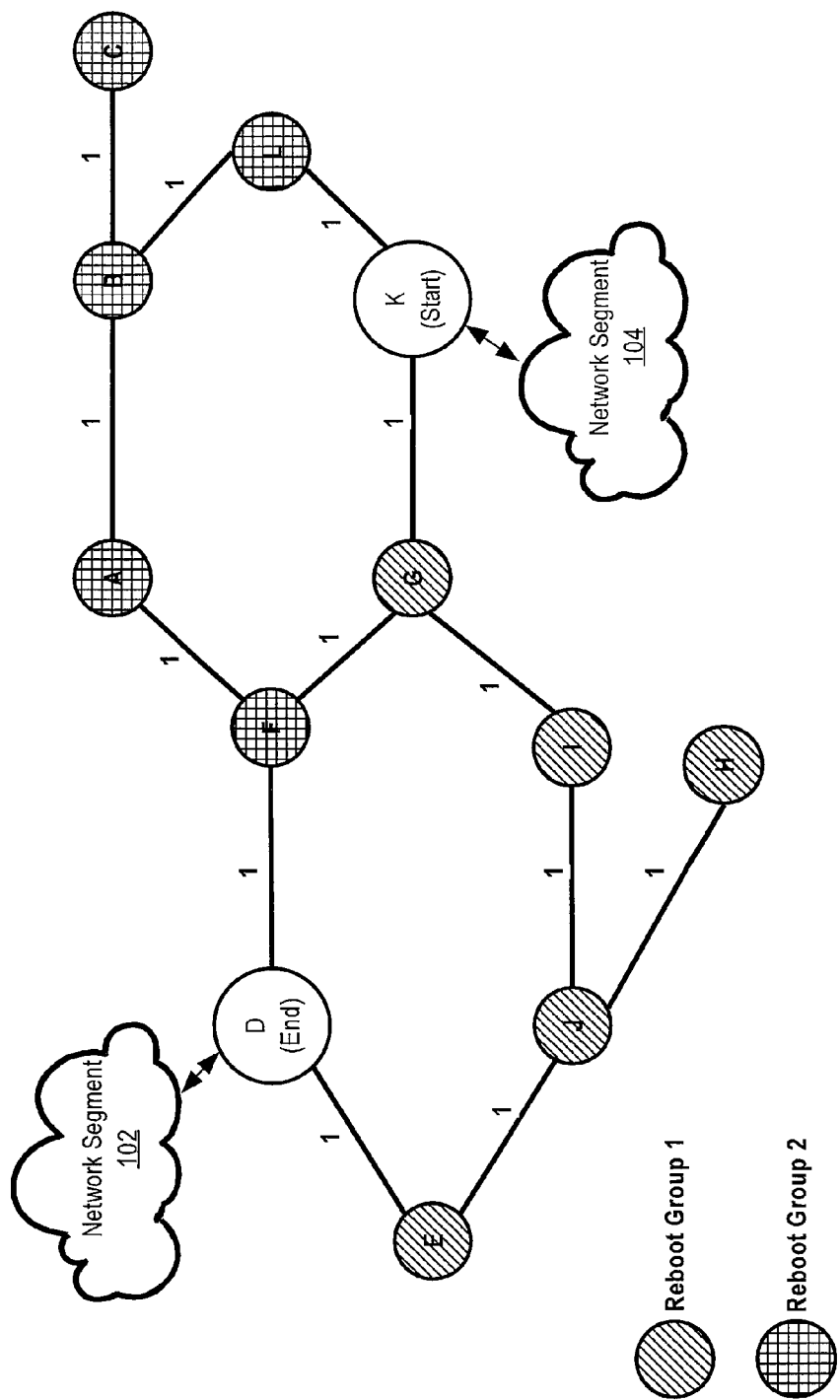
FIG. 5 illustrates an example of rebooting a node in coordination with rebooting another node in accordance with an embodiment.

FIG. 5 illustrates an example of rebooting a node in coordination with rebooting another node in accordance with an embodiment. As shown in FIG. 5, the nodes between node K and node D are divided into two groups. The first group includes nodes G, I, J, E, and H. Accordingly, the first group includes the nodes G, I, J and E that are on the first path between node K to node D: K-G-I-J-E-D. The second group includes nodes L, B, A, F, C. Accordingly, the second group includes the nodes L, B, A, F that are on the second path between node K to node D: K-L-B-A-F-D.

In this example, reboot group 1 is rebooted together or during a first time window, and reboot group 2 is rebooted together or during a second time window mutually exclusive from the first time window. By rebooting the nodes in coordination with other nodes along the same data path, at least one path from node K to node D may be made available at all times. Furthermore, by rebooting the nodes in coordination with other nodes along the same data path requires the least amount of downtime for each data path.

3.0 Hardware Overview

Figure 6:
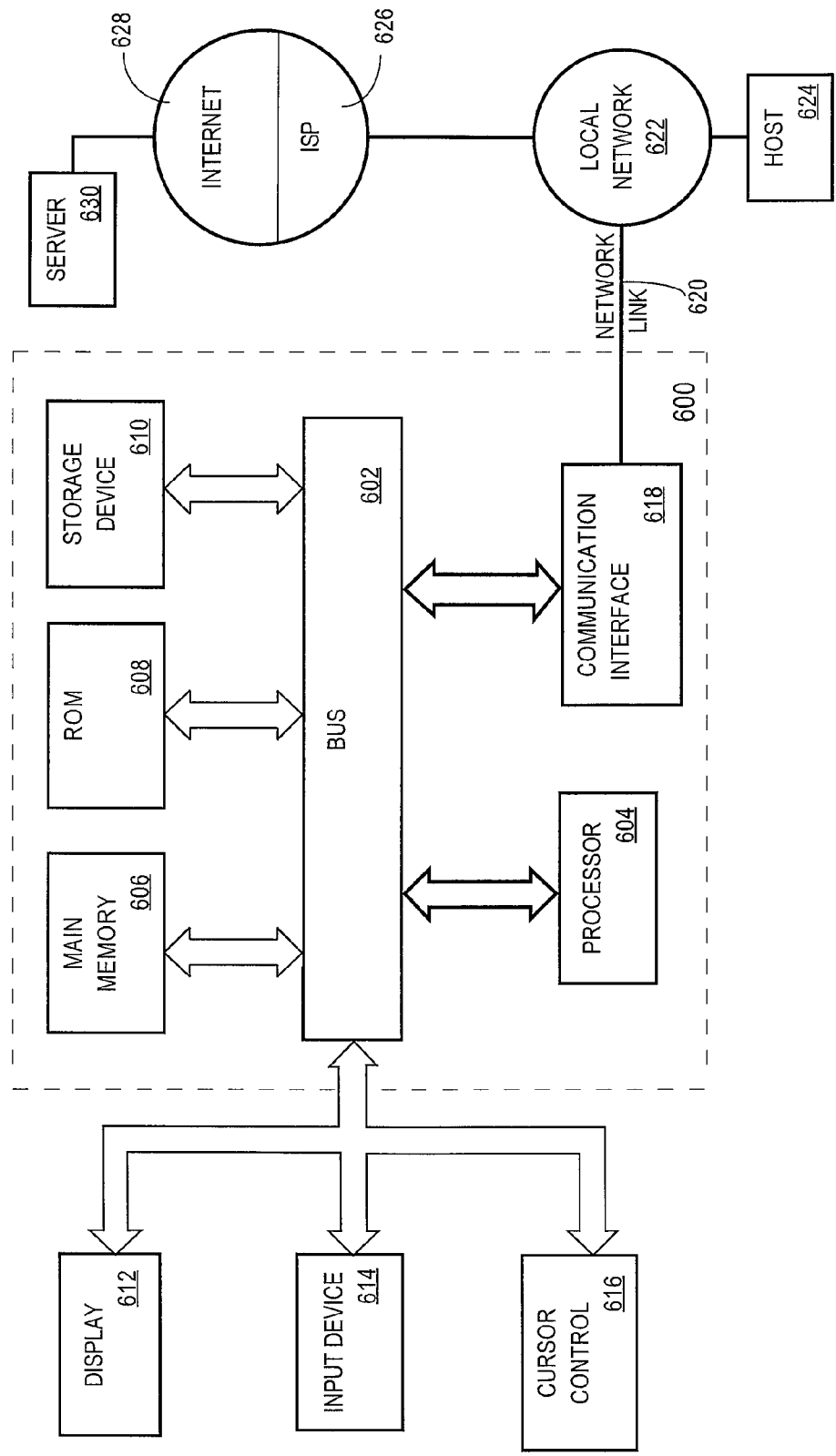
FIG. 6 illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for performing the techniques herein. According to one embodiment of the invention, performing the techniques herein is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as Internet 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for performing the techniques herein as described herein.

The received code may be executed by processor 604 as it is received, and/or stored in storage device 610, or other non-volatile storage for later execution. In this manner, computer system 600 may obtain application code in the form of a carrier wave.

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed:

1. An internetworking device comprising:
   one or more processors;
   logic coupled to the one or more processors and comprising one or more stored sequences of instructions which, when executed by one or more processors, cause the one or more processors to:
   obtain an elapsed runtime threshold associated with the internetworking device;
   self-monitor the internetworking device to identify an occurrence of elapsed runtime of the internetworking device meeting the elapsed runtime threshold; and
   self-reboot the internetworking device responsive to the occurrence of elapsed runtime of the internetworking device meeting the elapsed runtime threshold.

2. The internetworking device of claim 1, wherein the logic further comprises instructions which when executed cause the one or more processors to save a state associated with the internetworking device, and wherein the self-reboot is a planned reboot subsequent to saving the state associated with the internetworking device.

3. The internetworking device of claim 1, wherein the logic further comprises instructions which when executed cause the one or more processors to:
   obtain a second threshold associated with the internetworking device;
   self-monitor the internetworking device to identify an occurrence of the second threshold;
   self-reboot the internetworking device responsive to the occurrence of the second threshold;
   wherein the second threshold is any one or more of: a utilization threshold of a component in the internetworking device; an error rate threshold associated with the internetworking device; or a packet drop rate threshold associated with the internetworking device.

4. The internetworking device of claim 1, wherein the internetworking device is a router or a switch.

5. The internetworking device of claim 1, wherein the logic further comprises instructions which when executed cause the one or more processors to decrease network traffic routed through the internetworking device prior to rebooting the internetworking device.

6. The internetworking device of claim 1, wherein the logic further comprises instructions which when executed cause the one or more processors to decrease network traffic routed through the internetworking device prior to rebooting the internetworking device by any one of: increasing a cost of one or more links associated with the internetworking device prior to rebooting the internetworking device; temporarily disconnecting or disabling a connection from the internetworking device to one or more network devices prior to rebooting the internetworking device; or notifying one or more network devices of a rebooting time prior to rebooting the internetworking device.

7. The internetworking device of claim 1, wherein the logic further comprises instructions which when executed cause the one or more processors to coordinate a rebooting time of the internetworking device with a rebooting time of one or more network devices.

8. An internetworking device comprising in combination:
   one or more processors;
   means for obtaining an elapsed runtime threshold associated with the internetworking device;
   means for self-monitoring the internetworking device to identify an occurrence of elapsed runtime of the internetworking device meeting the elapsed runtime threshold; and
   means for self-rebooting the internetworking device responsive to the occurrence of the elapsed runtime of the internetworking device meeting the elapsed runtime threshold.

9. The internetworking device of claim 8, further comprising:
   means for obtaining a second threshold associated with the internetworking device;
   means for self-monitoring the internetworking device to identify an occurrence of the second threshold;
   means for self-rebooting the internetworking device responsive to the occurrence of the second threshold;
   wherein the second threshold is any one of a utilization threshold of a component in the internetworking device; an error rate threshold associated with the internetworking device; or a packet drop rate threshold associated with the internetworking device.

10. The internetworking device of claim 8, wherein the internetworking device is a router or a switch.

11. The internetworking device of claim 8, further comprising means for decreasing network traffic routed through the internetworking device prior to rebooting the internetworking device.

12. The internetworking device of claim 8, further comprising means for decreasing network traffic routed through the internetworking device prior to rebooting the internetworking device by: increasing a cost of one or more links associated with the internetworking device prior to rebooting the internetworking device; temporarily disconnecting or disabling a connection from the internetworking device to one or more network devices prior to rebooting the internetworking device; or notifying one or more network devices of a rebooting time prior to rebooting the internetworking device.

13. The internetworking device of claim 8, further comprising means for coordinating a rebooting time of the internetworking device with a rebooting time of one or more network devices.

14. A computer readable storage medium on an internetworking device comprising one or more sequences of instructions which when executed by one or more processors cause:
   obtaining an elapsed runtime threshold associated with the internetworking device;
   self-monitoring the internetworking device to identify an occurrence of the elapsed runtime of the internetworking device meeting the elapsed runtime threshold; and
   self-rebooting the internetworking device responsive to the occurrence of elapsed runtime of the internetworking device meeting the elapsed runtime threshold.

15. The computer readable storage medium of claim 14, wherein the one or more sequences of instructions when executed by one or more processors further cause:
   obtaining a second threshold associated with the internetworking device;
   self-monitoring the internetworking device to identify an occurrence of the second threshold;
   self-rebooting the internetworking device responsive to the occurrence of the second threshold;
   wherein the second threshold is any one of: a utilization threshold of a component in the internetworking device; an error rate threshold associated with the internetworking device; or a packet drop rate threshold associated with the internetworking device.

16. The computer readable storage medium of claim 14, wherein the internetworking device is a router or a switch.

17. The computer readable storage medium of claim 14, wherein the one or more sequences of instructions when executed by one or more processors further cause decreasing network traffic routed through the internetworking device prior to rebooting the internetworking device.

18. The computer readable storage medium of claim 14, wherein the one or more sequences of instructions when executed by one or more processors further cause decreasing network traffic routed through the working device prior to rebooting the internetworking device by: increasing a cost of one or more links associated with the internetworking device prior to rebooting the internetworking device; temporarily disconnecting or disabling a connection from the internetworking device to one or more network devices prior to rebooting the internetworking device; or notifying one or more network devices of a rebooting time prior to rebooting the internetworking device.

19. The computer readable storage medium of claim 14, wherein the one or more sequences of instructions when executed by one or more processors further cause coordinating a rebooting time of the internetworking device with a rebooting time of one or more network devices.

20. A data processing method comprising:
obtaining an elapsed runtime threshold associated with a network infrastructure element;
self-monitoring the network infrastructure element to identify an occurrence of elapsed runtime of the network infrastructure element meeting the elapsed runtime threshold; and
self-rebooting the network infrastructure element responsive to the occurrence of the elapsed runtime of the network infrastructure element meeting the elapsed runtime threshold.

21. The method of claim 20, further comprising:
obtaining a second threshold associated with the network infrastructure element;
self-monitor the network infrastructure element to identify an occurrence of the second threshold;
self-reboot the network infrastructure element responsive to the occurrence of the second threshold;
wherein the second threshold is any one of a utilization threshold of a component in the network infrastructure element; an error rate threshold associated with the network infrastructure element; or a packet drop rate threshold associated with the network infrastructure element.

22. The method of claim 20, further comprising decreasing network traffic routed through the internetworking device prior to rebooting the network infrastructure element.

* * * * *